(12) United States Patent
Hemphill et al.

(10) Patent No.: US 6,168,706 B1
(45) Date of Patent: Jan. 2, 2001

(54) PROCESS FOR PRODUCING HIGH ETCH GAINS FOR ELECTROLYTIC CAPACITOR MANUFACTURING

(75) Inventors: Ralph Jason Hemphill, Liberty; Thomas Flavian Strange, Easley, both of SC (US)

(73) Assignee: Pacesetter, Inc., Sunnyvale, CA (US)

( * ) Notice: Under 35 U.S.C. 154(b), the term of this patent shall be extended for 0 days.

(21) Appl. No.: 09/210,314

(22) Filed: Dec. 11, 1998

(51) Int. Cl.[7] .................................................. C25F 3/02
(52) U.S. Cl. .................. 205/675; 205/674; 205/213; 361/508; 361/509; 361/528; 361/529; 428/472.2; 428/596; 428/606; 428/687
(58) Field of Search .................... 205/674, 675, 205/213; 428/472.2, 596, 606, 687; 361/508, 509, 528, 529

(56) References Cited

U.S. PATENT DOCUMENTS

| | | | |
|---|---|---|---|
| 4,125,674 | * 11/1978 | Kimura et al. | 428/469 |
| 4,213,835 | 7/1980 | Fickelscher | 204/129.25 |
| 4,420,367 | 12/1983 | Lacher | 156/651 |
| 4,474,657 | 10/1984 | Arora | 204/129.75 |
| 4,518,471 | 5/1985 | Arora | 204/129.1 |
| 4,525,249 | 6/1985 | Arora | 204/129.75 |
| 5,143,587 | * 9/1992 | Endoh et al. | 204/129.85 |
| 5,715,133 | * 2/1998 | Harrington et al. | 361/500 |

* cited by examiner

Primary Examiner—Kathryn Gorgos
Assistant Examiner—Christopher M. Keehan
(74) Attorney, Agent, or Firm—Steven M. Mitchell

(57) ABSTRACT

Aluminum anode foil is etched using a process of treating the foil in an electrolyte bath composition comprising aluminum chloride hexahydrate, hydrochloric acid, sulfuric acid and perchloric acid or perchlorate. The anode foil is etched in the electrolyte bath composition by passing a direct current (DC) through the bath, resulting in an aluminum anode foil having a higher capacitance and/or metal strength than using known methods or etching compositions. The etched anode foil is suitable for use in an electrolytic capacitor.

19 Claims, 9 Drawing Sheets

PROCESS FOR PRODUCING HIGH ETCH GAINS FOR ELECTROLYTIC CAPACITOR MANUFACTURING

BACKGROUND OF THE INVENTION

1. Field of the Invention

The present invention relates to a four-component acid electrolyte composition and method for etching aluminum anode foil to render it suitable for use in electrolytic capacitors, and to such electrolytic capacitors.

2. Related Art

In known processes for etching aluminum foil, an electrolytic bath is used that contains sodium chloride or other salt, as well as sulfate based electrolytes. Such a solution typically has a neutral pH. The etching is usually followed by treatment in nitric or hydrochloric acid.

U.S. Pat. No. 4,213,835 discloses a method for electrolytically etching an aluminum foil. This process involves a pari-potentiostatic etching technique using a constant anode potential in a traveling bath containing chloride ions. Foils are thus provided with tunnel densities greater than $10^7$ tunnels/cm$^2$ of foil surface.

U.S. Pat. No. 4,420,367 discloses a method for etching an aluminum foil for electrolytic capacitors by carrying out an electrolytic tunnel etching process in a first etching stage, as known in the art. Non-electrolytic chemical etching is then used for enlarging the tunnels in one or several additional etching steps. The method is preferably carried out in a halogen-free or chloride-free solution having nitrate ions, such as $HNO_3$ and/or $Al(NO_3)_3$.

U.S. Pat. Nos. 4,474,657, 4,518,471 and 4,525,249 disclose the etching of aluminum electrolytic capacitor foil by passing the foil through an electrolyte bath. The bath contains 3% hydrochloric acid and 1% aluminum as aluminum chloride. The etching is carried out under a direct current (DC) and at a temperature of 75° C. 4,474,657 is limited to the above single step. 4,518,471 adds a second step where the etched foil is treated in a similar bath with a lower current density and at a temperature of 80–82.5° C. 4,525,249 adds a different second step, where the etched foil is treated in a bath of 8% nitric acid and 2.6% aluminum as a nitrate, at a temperature of 85° C.

However, such methods or compositions, which maintain adequate metal strength and improve capacitance, are not efficient enough to be suitable for use in the commercial production of electrolytic capacitors.

SUMMARY OF THE INVENTION

The present invention provides improved etching of aluminum anode foil for increased capacitance and/or metal strength, relative to known etching methods and compositions. The present invention provides the novel use of a four-component acid electrolyte to greatly improve etching gains in aluminum anode foil, suitable for use in electrolytic capacitors. The type of current, or the amount, ratio and/or concentration of a component used, provides the increased capacitance and/or metal strength.

Accordingly, the present invention provides improved methods and compositions for etching aluminum foil, as well as electrolytic capacitors comprising this foil.

DETAILED DESCRIPTION OF THE INVENTION

Figure 1:
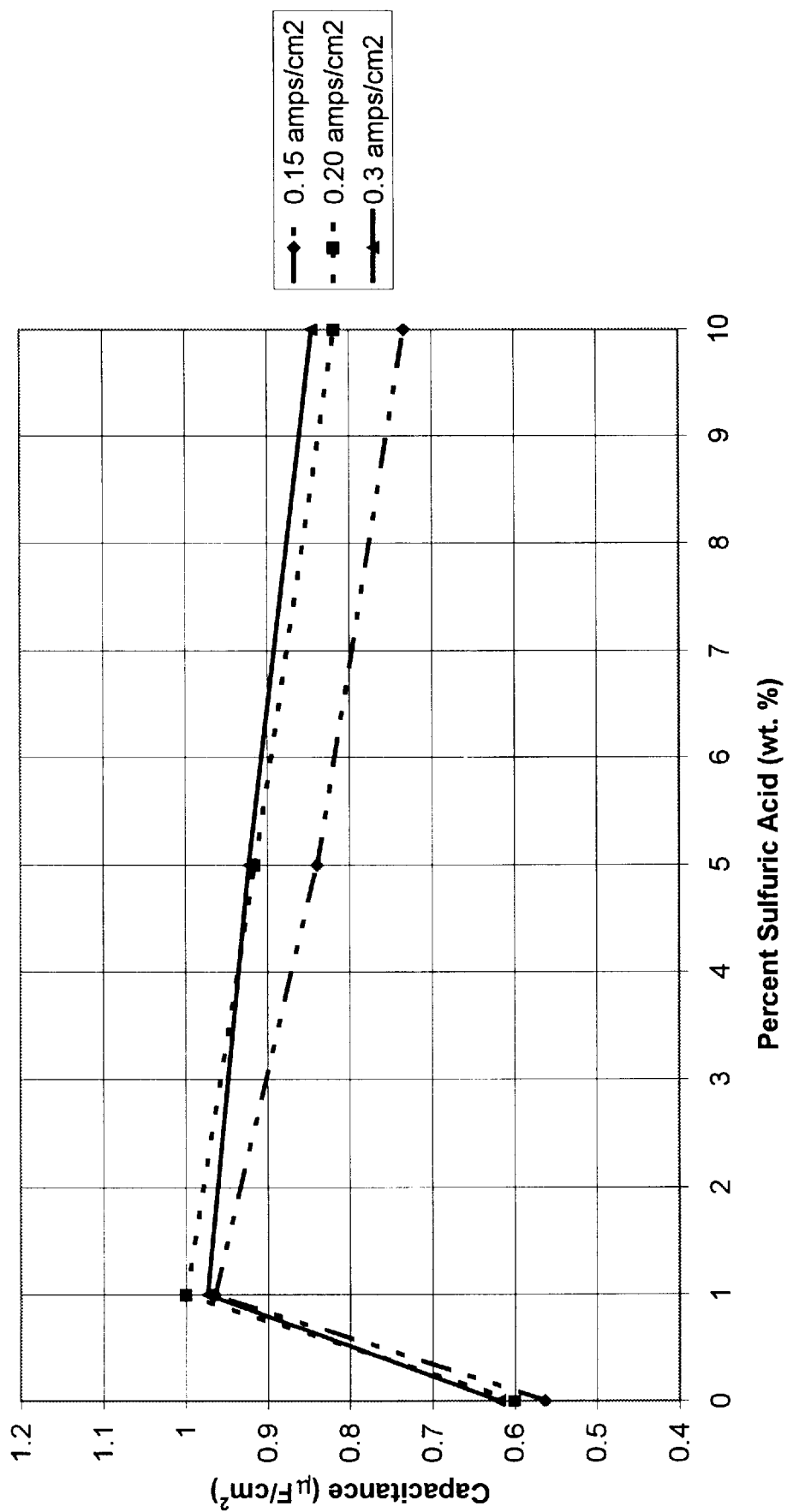
FIG. 1 shows, in the form of three curves, capacitance as a function the percent of sulfuric acid in an etch solution containing sulfuric acid, 0.62% HCl and 3.5% $NaClO_4$ for three different current densities, 0.15 amps/cm$^2$, 0.20 amps/cm$^2$ and 0.30 amps/cm$^2$.

The present invention provides etching of aluminum anode foil to improve capacitance and/or metal strength. Several factors contribute to increasing the specific capacitance of aluminum electrolytic capacitor foil. One factor is the amount of increase in tunnel density (i.e., the number of tunnels per square centimeter). As tunnel density is increased, a corresponding enlargement of the overall surface area will occur. Another factor controlling the increase in specific capacitance is the type of etch process, which controls the tunnel initiation, as well as the depth and width of the etched tunnels.

In the method of the present invention, the foil can be etched anodically under the influence of a DC current in an electrolyte bath. The electrolyte bath comprises aluminum chloride hexahydrate ($AlCl_3*6H_2O$), hydrochloric acid (HCl), sodium perchlorate ($NaClO_4$) or perchloric acid ($HClO_4$) and sulfuric acid ($H_2SO_4$).

The ratio of chloride ($^-Cl$) to perchlorate ($^-ClO_4$) (either as acid or a salt with alkali metals) can be preferably maintained as about 0.14–0.17 grams by weight, with 0.153 (gram weight) preferred.

In the electrolytic bath composition, the amount of aluminum chloride hexahydrate can be about 0.1–1% by weight (e.g., 0.1–0.8, 0.2–0.7 and 0.3–0.6% by weight), with about 0.5% by weight preferred. The amount of hydrochloric acid can be about 0.1–5.0% by weight (e.g., 0.2–4.0, 0.2–2.0, 0.3–1.0 and 0.5–0.8% by weight), with about 0.62% by weight preferred. The amount of perchlorate can be about 0.5–36% by weight (e.g., 0.9–30, 2–20, 3–10, 3–5% by weight), with about 3.5% by weight preferred. The amount of sulfuric acid can be about 0.1–25% by weight (e.g., 0.5–20, 1–15, 2–10, and 4–8% by weight), with about 1–5% by weight preferred for limited tunnel length control, and 20–25% by weight preferred for full tunnel length control. The sulfuric acid concentration and the $Cl/ClO_4$ concentration is preferably adjusted to increase viscosity so as to provide the desired amount of control of tunnel lengths. Any value or range in the above ranges can also be used according to the present invention.

The most preferred electrolyte bath composition for use in the present invention to yield the highest capacitance comprises about 0.62% by weight hydrochloric acid, about 3.5% by weight sodium perchlorate, about 4.0% by weight sulfuric acid and about 0.5% by weight aluminum chloride hexahydrate.

Etching is preferably carried out at DC charge density of about 0.1–0.5 $A/cm^2$ (e.g., at 0.2–0.4, 0.3–0.4 A-$cm^2$), and more preferably of about 0.2–0.3 $A/cm^2$. The etching can be carried out with an etching charge of about 10–50 coulombs/$cm^2$ (e.g., at 15–45 or 20–40 or 20–30 coulombs/$cm^2$), and preferably about 20 to 30 coulombs/$cm^2$. Area is as projected area and not actual surface area. The foil is preferably biased anodically under a DC potential. The etching temperature is preferably set at about 80–95° C., and more preferably at about 85 to 90° C. The pH of the bath is acidic, preferably about 0–1.5. In an optional further step, tunnel enlargement (or widening) is carried out by any suitable method known in the art, such as that disclosed in U.S. Pat. No. 4,518,471 to Arora and U.S. Pat. No. 4,525,249 to Arora, entirely incorporated herein by reference.

The process of the present invention results in a very efficient and economical etching process that yields capacitance values equal to or significantly higher than available foils, without requiring major changes in existing production machinery. Other advantages of this process are that etched tunnel structures are obtained with a tunnel density at least about $1.5 \times 10^7$ tunnels/$cm^2$, more preferably at least about $2.0 \times 10^7$ tunnels/$cm^2$ and most preferably at least about $3 \times 10^7$ tunnels/$cm^2$ of the foil surface area. The etched tunnels are also more uniformly distributed over the foil. The present invention thus provides the highest possible surface enlargement and capacitance gain with the smallest possible aluminum erosion, thus increasing foil metal strength.

Foils etched in accordance with the present invention can thus be used in high voltage electrolytic capacitors and can yield a significantly higher specific capacitance per square centimeter than previously obtained. Thus, to obtain a given capacitance, the capacitor can have a smaller volume or, for the same volume, can have a higher capacitance. Etch gains result in at least about 60–120% higher capacitance using this method than under previous known methods.

The foil used for etching according to the present invention is preferably etchable aluminum strip of high cubicity. High cubicity in the context of the present invention is where at least 85% of crystalline aluminum structure is oriented in a normal position (i.e., a (1,0,0) orientation) relative to the surface of the foil. The foil used for etching is also preferably of high purity. Such foils are well-known in the art and are readily available from commercial sources.

The present invention thus also provides electrolytic capacitors comprising etched aluminum anode foil etched by methods and/or compositions according to the present invention. Such capacitors can be made using any suitable method known in the art. Non-limiting examples of such methods arc disclosed, e.g., in the following references which are entirely incorporated herein by reference: U.S. Pat. Nos. 4,696,082 to Fonfria et al., 4,663,824 to Kenmochi, 3,872,579 to Papadopoulos, 4,541,037 to Ross et al., 4,266,332 to Markarian et al., 3,622,843 to Vermilyea et al., and 4,593,343 to Ross.

Having now generally described the invention, the same will be more readily understood through reference to the following examples which are provided by way of illustration, and are not intended to be limiting of the present invention.

EXAMPLE 1

In our first experiment, three 80 $cm^2$ sample foils were etched in a 0.62% HCl and 3.5% $NaClO_4$ solution, each at an etching charge of 20 coulombs/$cm^2$ and a current density of 0.15, 0.20, or 0.30 amp/$cm^2$. The percentages of HCl and $NaClO_4$ were held constant, and sulfuric acid was added to make etch solutions of 1%, 5%, and 10% $H_2SO_4$. Sample foils were etched with the varying sulfuric acid concentrations.

All sample foils were widened at 60 coulombs/$cm^2$ for 300 seconds. The foils were hydrated for eight minutes, formed (0.03% citric acid) to 445 Volts at 0.050 amps/$cm^2$, and the current was allowed to drop to 1.75 milliamps/$cm^2$. The foils were put into a 2% phosphoric acid solution for 2 minutes and finally, reformed (0.03% citric acid) to 430 Volts at 0.025 amps/$cm^2$ and dropped to 0.5 milliamps/$cm^2$. The results, shown in the Table 1 below, indicated that the 1% sulfuric acid etched foil showed a marginally higher capacitance at all three current densities, see FIG. 1.

Etch Solution Study (Table 1)

| Sample # | Etching Charge (coulombs/$cm^2$) | Time | Current Density (A/$cm^2$) | Current (amps) | $H_2SO_4$ % | Cap ($\mu F$/$cm^2$) | Dissipation Factor |
|---|---|---|---|---|---|---|---|
| 357 | 20 | 2'13" | 0.15 | 12 | 0 | 0.56 | — |
| 358 | 20 | 1'40" | 0.2 | 16 | 0 | 0.60 | — |
| 359 | 20 | 1'6.7" | 0.3 | 24 | 0 | 0.62 | — |
| 360 | 20 | 2'13" | 0.15 | 12 | 1 | 0.97 | 0.058 |
| 361 | 20 | 1'40" | 0.2 | 16 | 1 | 1.00 | 0.610 |
| 362 | 20 | 1'6.7" | 0.3 | 24 | 1 | 0.97 | 0.670 |
| 363 | 20 | 2'13" | 0.15 | 12 | 5 | 0.84 | 0.050 |
| 364 | 20 | 1'40" | 0.2 | 16 | 5 | 0.92 | 0.055 |
| 365 | 20 | 1'6.7" | 0.3 | 24 | 5 | 0.92 | 0.055 |
| 367 | 20 | 2'13" | 0.15 | 12 | 10 | 0.73 | 0.042 |
| 368 | 20 | 1'40" | 0.2 | 16 | 10 | 0.82 | 0.054 |
| 369 | 20 | 1'6.7" | 0.3 | 24 | 10 | 0.85 | 0.050 |

| Sample # | Final Weight Loss (After Etch and Widening) (g) | Percent Al In Etch |
|---|---|---|
| 357 | 0.6019 | 0.004 |
| 358 | 0.5997 | 0.008 |
| 359 | 0.5973 | 0.012 |
| 360 | 0.6114 | 0.017 |
| 361 | 0.6133 | 0.021 |
| 362 | 0.6151 | 0.025 |
| 363 | 0.6151 | 0.029 |
| 364 | 0.6144 | 0.033 |
| 365 | 0.6157 | 0.037 |
| 367 | 0.6059 | 0.041 |
| 368 | 0.6122 | 0.045 |
| 369 | 0.6159 | 0.049 |

EXAMPLE 2

In the next experiment, sample foils were etched in a solution of 0.62% HCl, 3.5% $NaClO_4$, and 1% $H_2SO_4$. The current density remained constant at 0.25 amp/$cm^2$. The etching charge was varied from 5 coulombs/$cm^2$ to 40 coulombs/$cm^2$ by increments of five coulombs per step. The sample foils were widened and hydrated the same as above.

Figure 2:
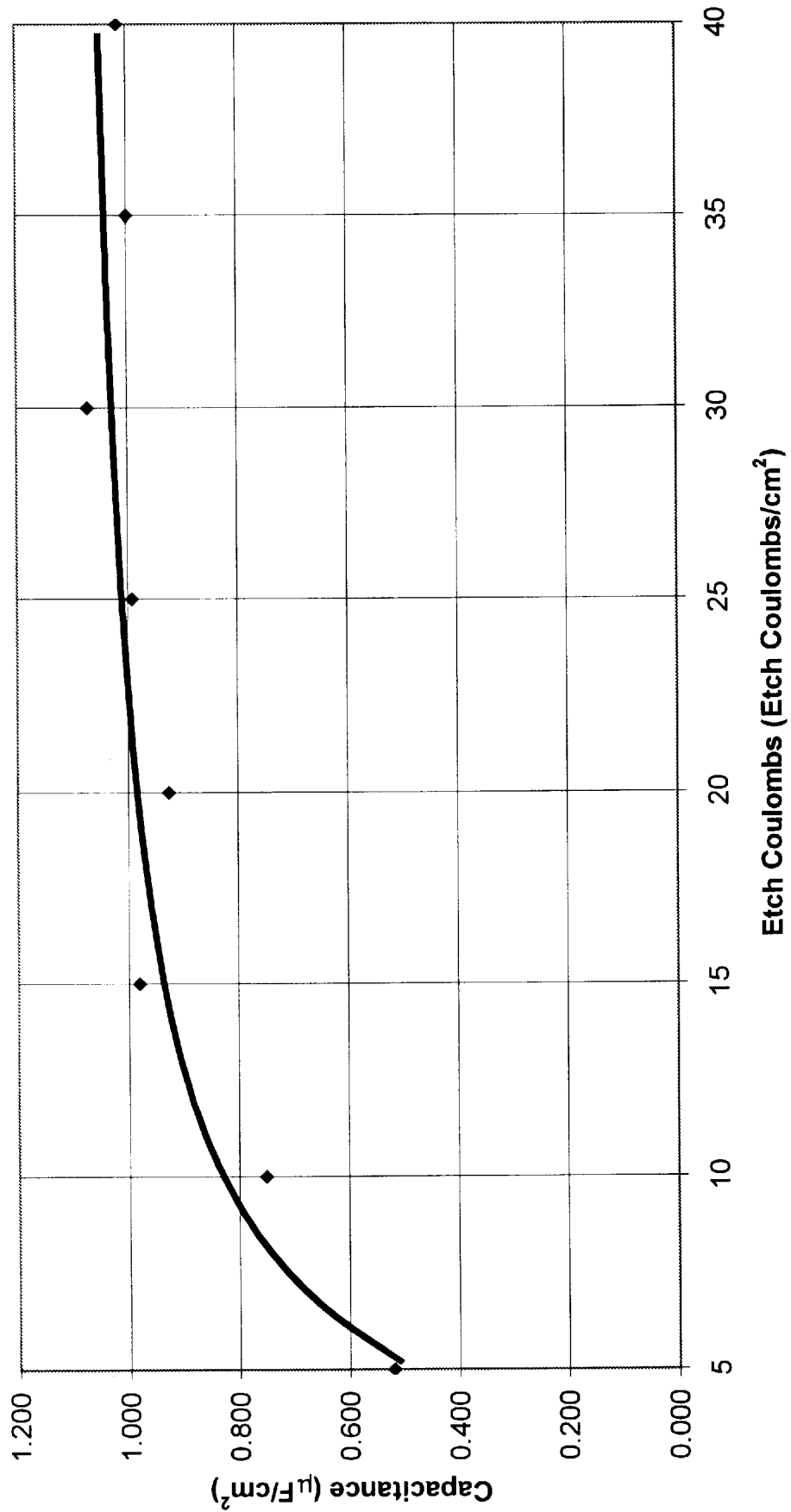
FIG. 2 shows capacitance as a function of the etch coulombs for an etch solution containing 0.62% HCl, 3.5% $NaClO_4$ and 1% $H_2SO_4$.

Then, the foils were formed to 440 Volts, at a current of 0.12 amps/cm$^2$, and down to a current of 1.52 milliamps/cm$^2$. The foils were put in a 2% phosphoric acid solution for two minutes, and lastly, reformed to 430 Volts, at a current of 0.12 amps/cm$^2$, and down to a current of 0.96 milliamps/cm$^2$. The results, shown in Table 2 below, indicated that tunnel initiation flattens at 15 coulombs/cm$^2$, see FIG. 2.

Etch Solution Study (Table 2)

| Sample # | Etching Charge (coulombs/cm$^2$) | Time (sec) | Current Density (amp/cm$^2$) | Current (amps) | Cap ($\mu$F/cm$^2$) | Dissipation Factor |
|---|---|---|---|---|---|---|
| 370 | 5 | 20 | 0.25 | 20 | 0.519 | 0.038 |
| 371 | 10 | 40 | 0.25 | 20 | 0.751 | 0.044 |
| 372 | 15 | 60 | 0.25 | 20 | 0.980 | 0.074 |
| 373 | 20 | 80 | 0.25 | 20 | 0.926 | 0.079 |
| 374 | 25 | 100 | 0.25 | 20 | 0.992 | 0.086 |
| 375 | 30 | 120 | 0.25 | 20 | 1.072 | 0.102 |
| 376 | 35 | 140 | 0.25 | 20 | 1.000 | 0.077 |
| 377 | 40 | 160 | 0.25 | 20 | 1.016 | 0.084 |

| Sample # | Final Weight Loss (After Etch and Widening) (g) | Percent Al In Etch |
|---|---|---|
| 370 | 0.4742 | 0.050 |
| 371 | 0.5282 | 0.053 |
| 372 | 0.5721 | 0.059 |
| 373 | 0.6102 | 0.069 |
| 374 | 0.6536 | 0.085 |
| 375 | 0.6978 | 0.107 |
| 376 | 0.7369 | 0.136 |
| 377 | 0.7787 | 0.172 |

EXAMPLE 3

Figure 3A:
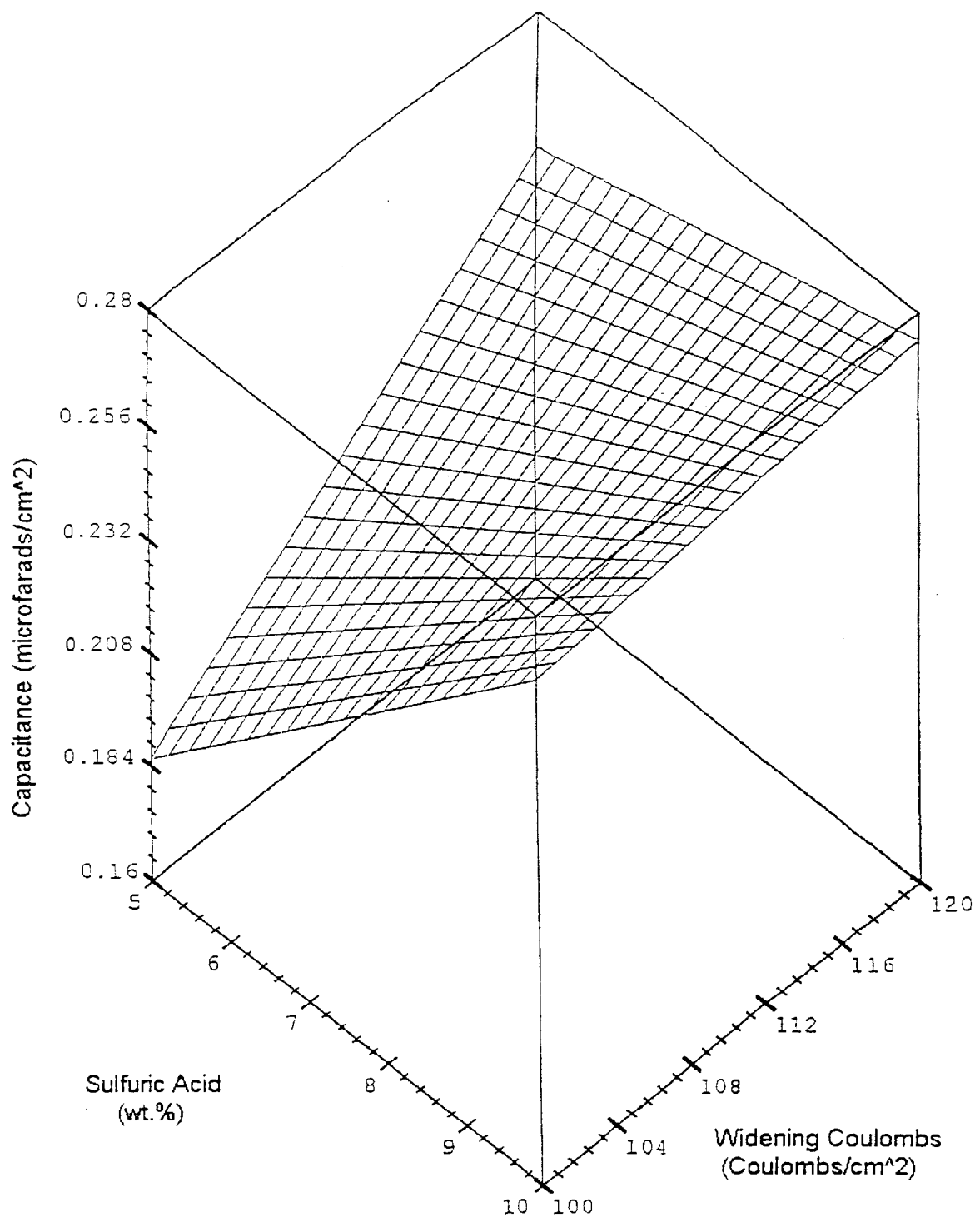
FIG. 3a shows a three dimensional graphical representation of capacitance as a function of the percent of sulfuric acid in an etch solution containing sulfuric acid, 0.62% HCl and 3.5% $NaClO_4$ and the widening coulombs, where the etch temperature is 84° C.
Figure 3B:
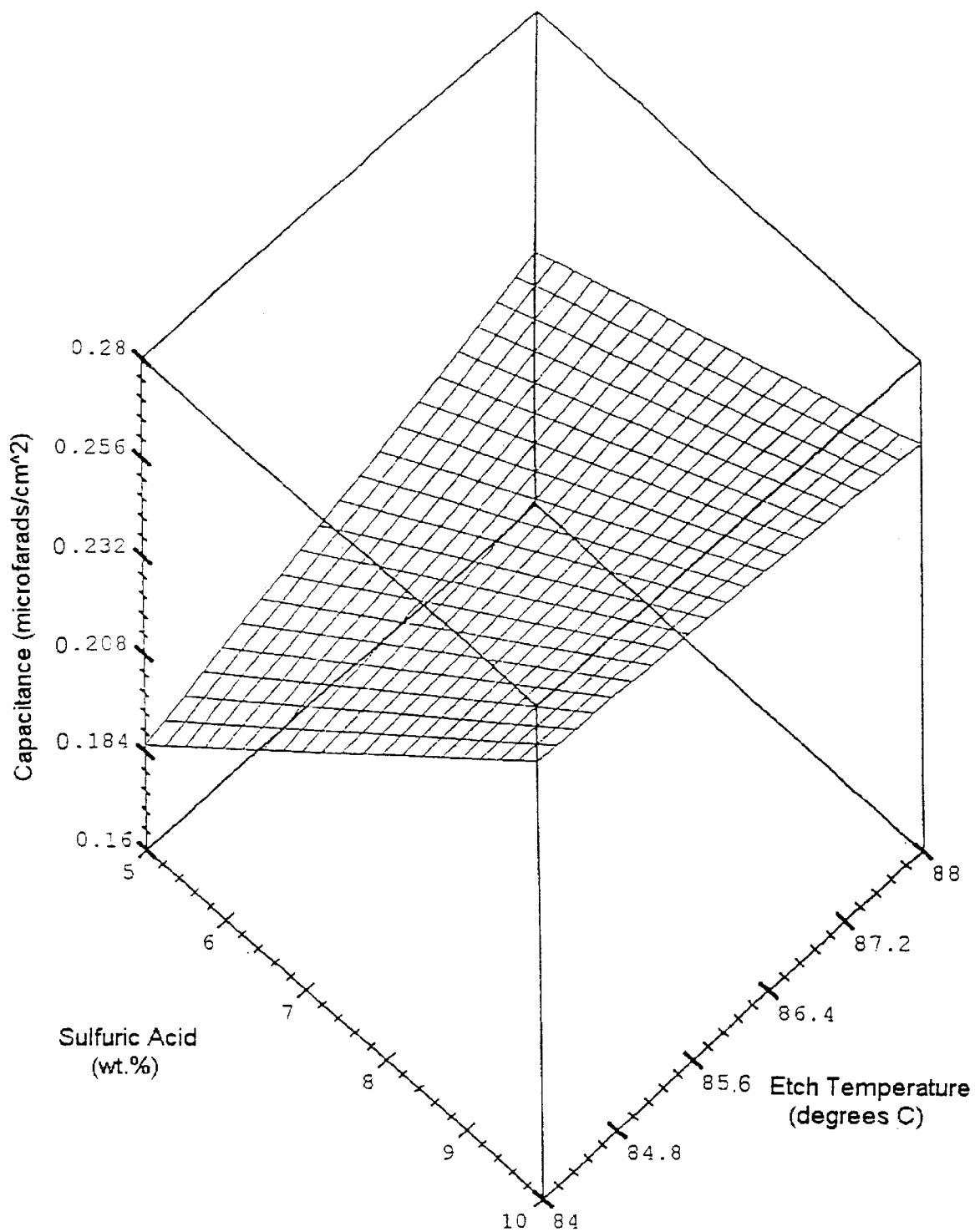
FIG. 3b shows a three dimensional graphical representation of capacitance as a function of the percent of sulfuric acid in an etch solution containing sulfuric acid, 0.62% HCl and 3.5% $NaClO_4$ and the etch temperature, where the widening coulombs are 100 coulombs/cm$^2$.

To explore the suitability of this etch process with a very high voltage formation process for a medium foil, sample foils were etched in a solution of 0.62% HCl, 3.5% NaClO$_4$ and 5% or 10% H$_2$SO$_4$, each at 20 coulombs/cm$^2$ and a current density of 0.25 amp/cm$^2$. The sample foils were widened at a current density of 0.15 amp/cm$^2$ and either 100 coulombs/cm$^2$ for 666.7 seconds or 120 coulombs/cm$^2$ for 800 seconds. The foils were hydrated for 12 minutes in DI water at 95° C. Next, the foils were put through a high voltage formation process, known to people skilled in the art, of about 900 Volts. The results, shown in Table 3 below, indicated that the etch temperature has a small effect on the capacitance at high values of sulfuric acid (see FIG. 3*b*). However, the percent sulfuric acid and the widening coulombs do have a large effect on the capacitance of the foil samples (see FIG. 3*a*). The results indicate that in order to reach high capacitance values, the etch solution should consist of 10% Sulfuric Acid and 120 coulombs of widening. The capacitance ($\mu$F/cm$^2$) should be noted compared to foil formation at a formation voltage of about 435 Volts. Higher voltages do not allow for the same capacitance achieved at the lower voltages. Therefore, the capacitance values per cm$^2$ in Table 3 are lower than the foil samples formed at an EFV of about 435 Volts.

Etch Solution Study (Table 3)

| Sample # | Widening Coulombs (coulombs/cm$^2$) | Widening Time (seconds) | H$_2$SO$_4$% | Etch Temp (° C.) | Cap ($\mu$F/cm$^2$) |
|---|---|---|---|---|---|
| 3024 | 100 | 666.7 | 5 | 84 | 0.1856 |
| 3025 | 120 | 800 | 5 | 84 | 0.2504 |
| 3026 | 100 | 666.7 | 5 | 88 | 0.2208 |
| 3027 | 120 | 800 | 5 | 88 | 0.2768 |
| 3028 | 100 | 666.7 | 10 | 84 | 0.2664 |
| 3029 | 120 | 800 | 10 | 84 | 0.2744 |
| 3030 | 100 | 666.7 | 10 | 88 | 0.2600 |
| 3031 | 120 | 800 | 10 | 88 | 0.2352 |

EXAMPLE 4

Figure 4:
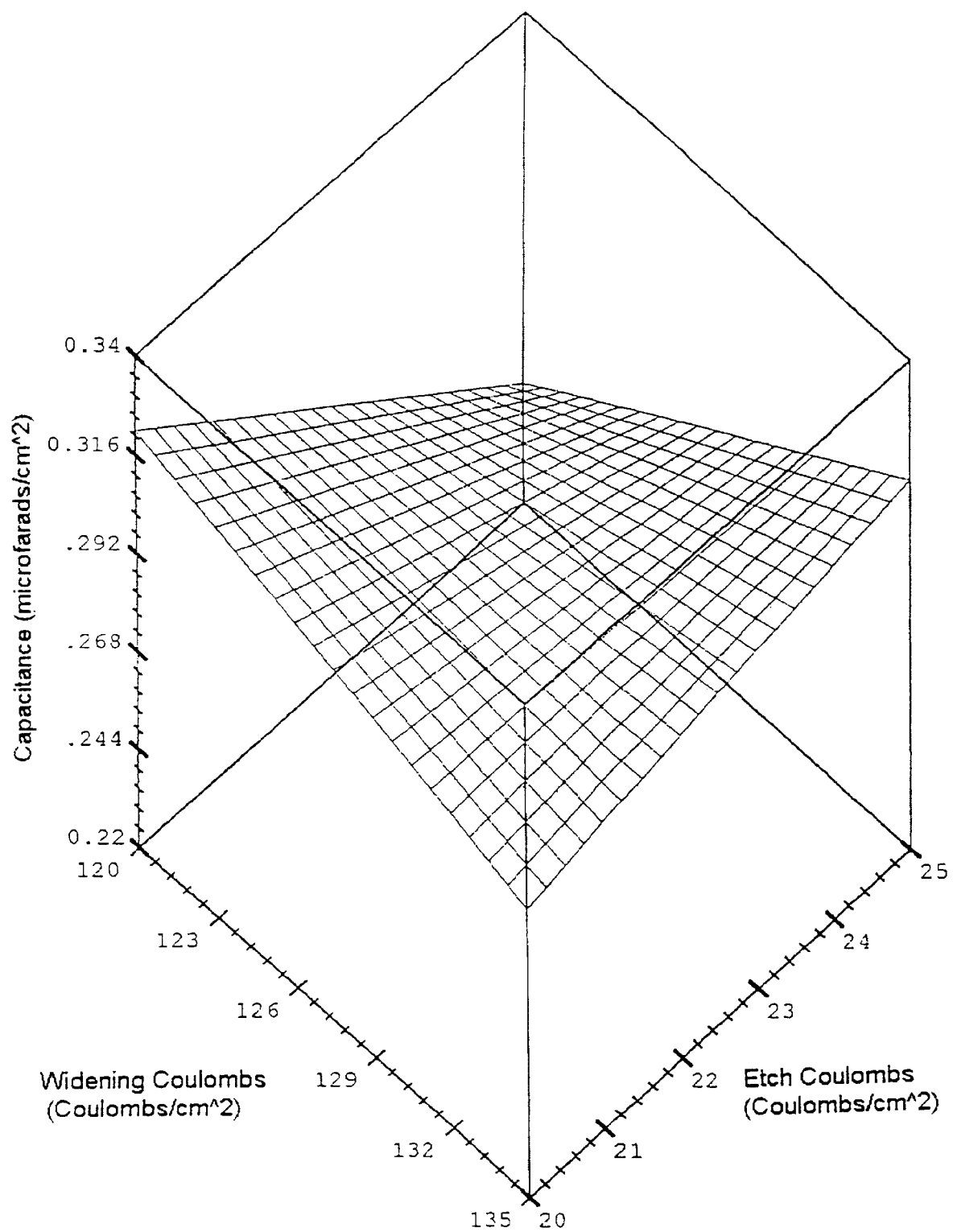
FIG. 4 shows a three dimensional graphical representation of capacitance as a function of the widening coulombs and the etch coulombs.

Sample foils were etched in a solution of 0.62% HCl, 3.5% NaClO$_4$, and 5% H$_2$SO$_4$, each at 20 or 25 coulombs/cm$^2$ and a current density of 0.25 amp/cm$^2$. The sample foils were widened at a current density of 0.15 amp/cm$^2$ and 120, 125, 130, or 135 coulombs/cm$^2$. The foils were hydrated for 12 minutes in DI water at 95° C. Next, the foils were put through a high voltage formation process, known to people skilled in the art, of about 900 Volts. The results, shown in Table 4 below, indicated that the capacitance of the foil samples is effected by the widening coulombs and etch coulombs. A foil sample that is widened at 120 coulombs and etched at 20 coulombs yielded the highest capacitance values, see FIG. 4.

Etch Solution Study (Table 4)

| Sample # | Etch Charge (coulombs/cm$^2$) | Etch Time (seconds) | Widening Charge (coulombs/cm$^2$) | Widening Time (seconds) | Cap ($\mu$F/cm$^2$) |
|---|---|---|---|---|---|
| 3032 | 20 | 80 | 120 | 800 | 0.322 |
| 3033 | 20 | 80 | 125 | 833 | 0.274 |
| 3034 | 20 | 80 | 130 | 867 | 0.340 |
| 3035 | 20 | 80 | 135 | 900 | 0.290 |
| 3036 | 25 | 100 | 120 | 800 | 0.249 |
| 3037 | 25 | 100 | 125 | 833 | 0.315 |
| 3038 | 25 | 100 | 130 | 867 | 0.308 |
| 3039 | 25 | 100 | 135 | 900 | 0.311 |

EXAMPLE 5

Figure 5A:
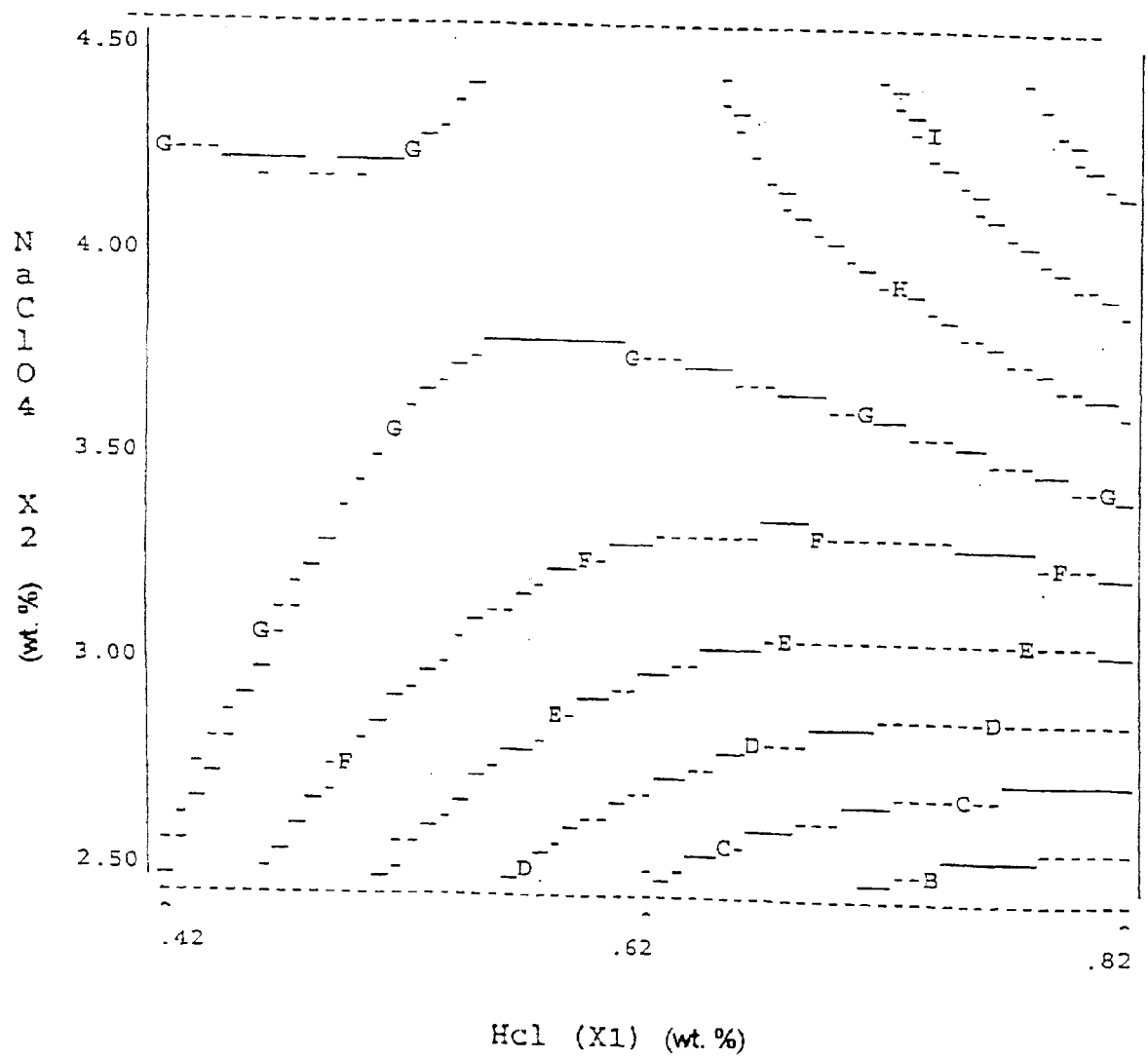
FIG. 5a shows a three level Response Surface Methodology (RSM) map of an etch solution having 1% sulfuric acid and varying concentrations of $NaClO_4$ and HCl.
Figure 5B:
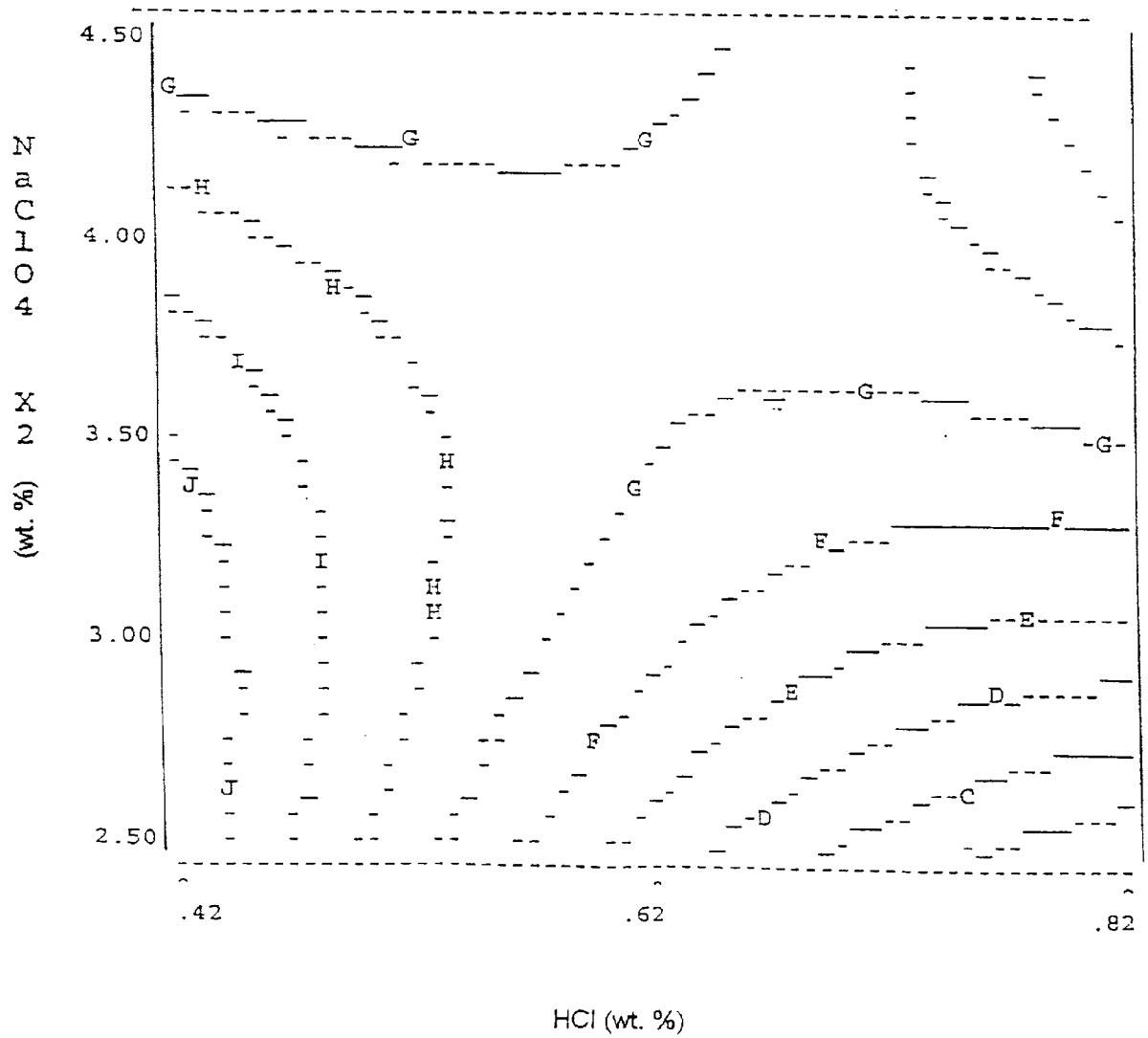
FIG. 5b shows a three level Response Surface Methodology (RSM) map of an etch solution having 5% sulfuric acid and varying concentrations of $NaClO_4$ and HCl.

Sample foils were etched in solutions having varying concentrations of HCl, NaClO$_4$, and H$_2$SO$_4$, each at 20 coulombs/cm$^2$ and a current density of 0.25 amps/cm$^2$. A three level RSM (Response Surface Methodology; McKesson) experiment was constructed in which the percentages of HCl, NaClO$_4$, and H$_2$SO$_4$, were varied. All sample foils were widened at 60 coulombs/cm$^2$ and 0.15 amps/cm$^2$. The foils were hydrated for eight minutes, formed (0.03% citric acid) to 440 Volts at 0.12 amps/cm$^2$ and the current was allowed to drop to 1.52 milliamps/cm$^2$. The foils were put into a 2% phosperic acid solution for solution for 2 minutes and finally, reformed (0.03% citric acid) to 430 Volts at 0.12 amps/cm$^2$ and dropped to 0.96 milliamps/cm$^2$. The results, shown in Table 5 below, indicated that at a low H$_2$SO$_4$ percentage (about 1%), the HCl and NaClO$_4$ percentages should be in the range of 0.82% and 4.5%, respectively, in order to yield the higher capacitance values. However, at about 5% $H_2SO_4$, 3.1% $NaClO_4$ and 0.45% HCl become the optimum concentrations for higher capacitance, see FIGS. 5a and 5b.

Etch Solution Study (Table 5)

| Sample # | % HCl | % $NaClO_4$ | % $H_2SO_4$ | Cap ($\mu F/cm^2$) | Dissipation Factor |
|---|---|---|---|---|---|
| 127 | 0.62 | 2.5 | 1 | 0.792 | 0.044 |
| 128 | 0.62 | 2.5 | 1 | 0.830 | 0.043 |
| 129 | 0.62 | 3.5 | 3 | 0.829 | 0.040 |
| 130 | 0.62 | 3.5 | 3 | 0.837 | 0.042 |
| 131 | 0.62 | 3.5 | 3 | 0.819 | 0.042 |
| 132 | 0.62 | 3.5 | 3 | 0.847 | 0.051 |
| 133 | 0.62 | 3.5 | 3 | 0.854 | 0.049 |
| 134 | 0.62 | 3.5 | 3 | 0.877 | 0.052 |
| 135 | 0.62 | 4.5 | 5 | 0.843 | 0.056 |
| 136 | 0.62 | 4.5 | 5 | 0.822 | 0.046 |
| 137 | 0.82 | 3.5 | 1 | 0.902 | 0.059 |
| 138 | 0.82 | 3.5 | 1 | 0.922 | 0.060 |
| 139 | 0.82 | 3.5 | 5 | 0.806 | 0.052 |
| 140 | 0.82 | 3.5 | 5 | 0.813 | 0.054 |
| 141 | 0.82 | 2.5 | 3 | 0.742 | 0.048 |
| 142 | 0.82 | 2.5 | 3 | 0.768 | 0.048 |
| 143 | 0.82 | 4.5 | 3 | 0.930 | 0.060 |
| 144 | 0.82 | 4.5 | 3 | 0.937 | 0.060 |
| 146 | 0.42 | 3.5 | 1 | 0.966 | 0.075 |
| 147 | 0.42 | 3.5 | 1 | 0.973 | 0.067 |
| 148 | 0.42 | 3.5 | 5 | 0.911 | 0.066 |
| 149 | 0.42 | 3.5 | 5 | 0.923 | 0.062 |
| 150 | 0.42 | 2.5 | 3 | 0.892 | 0.065 |
| 151 | 0.42 | 2.5 | 3 | 0.889 | 0.061 |
| 152 | 0.42 | 2.5 | 3 | 0.976 | 0.069 |
| 153 | 0.62 | 2.5 | 5 | 0.724 | 0.052 |
| 154 | 0.62 | 2.5 | 5 | 0.771 | 0.055 |
| 155 | 0.62 | 4.5 | 1 | 0.947 | 0.072 |
| 156 | 0.62 | 4.5 | 1 | 1.003 | 0.070 |
| 157 | 0.42 | 4.5 | 3 | 0.811 | 0.054 |
| 158 | 0.42 | 4.5 | 3 | 0.786 | 0.047 |

EXAMPLE 6

Sample foils were etched in a solution of 0.62% HCl, 3.5% $NaClO_4$, and 5% $H_2SO_4$, each at 20 coulombs/$cm^2$ and a current density of 0.25 amp/$cm^2$. The sample foils were widened at a current density of 0.15 amp/$cm^2$ and 125 coulombs/$cm^2$. The foils were hydrated for 12 minutes in DI water at 95° C. Next, the foils were put through a high voltage formation process of about 900 Volts, as known by people skilled in the art. The results, shown in Table 6 below, indicated that the use of the indicated acid etch produces foil formed at high voltages of about 900 Volts of an average capacitance value of 0.348 $\mu F/cm^2$.

Etch Solution Study (Table 6)

| Sample # | Etch Charge (coulombs/$cm^2$) | Etch Time (seconds) | Widening Charge (coulombs/$cm^2$) | Widening Time (seconds) | Cap ($\mu F/cm2$) |
|---|---|---|---|---|---|
| 3040 | 20 | 80 | 125 | 833 | 0.307 |
| 3041 | 20 | 80 | 125 | 833 | 0.310 |
| 3042 | 20 | 80 | 125 | 833 | — |
| 3043 | 20 | 80 | 125 | 833 | — |
| 3044 | 20 | 80 | 125 | 833 | — |
| 3045 | 20 | 80 | 125 | 833 | — |
| 3046 | 20 | 80 | 125 | 833 | — |
| 3047 | 20 | 80 | 125 | 833 | 0.344 |
| 3048 | 20 | 80 | 125 | 833 | 0.348 |
| 3049 | 20 | 80 | 125 | 833 | 0.337 |
| 3050 | 20 | 80 | 125 | 833 | 0.345 |
| 3051 | 20 | 80 | 125 | 833 | 0.352 |
| 3052 | 20 | 80 | 125 | 833 | 0.344 |
| 3053 | 20 | 80 | 125 | 833 | 0.339 |
| 3054 | 20 | 80 | 125 | 833 | 0.367 |
| 3055 | 20 | 80 | 125 | 833 | 0.346 |
| 3056 | 20 | 80 | 125 | 833 | 0.384 |
| 3057 | 20 | 80 | 125 | 833 | 0.373 |
| 3058 | 20 | 80 | 125 | 833 | — |
| 3059 | 20 | 80 | 125 | 833 | 0.378 |

EXAMPLE 7

Figure 6:
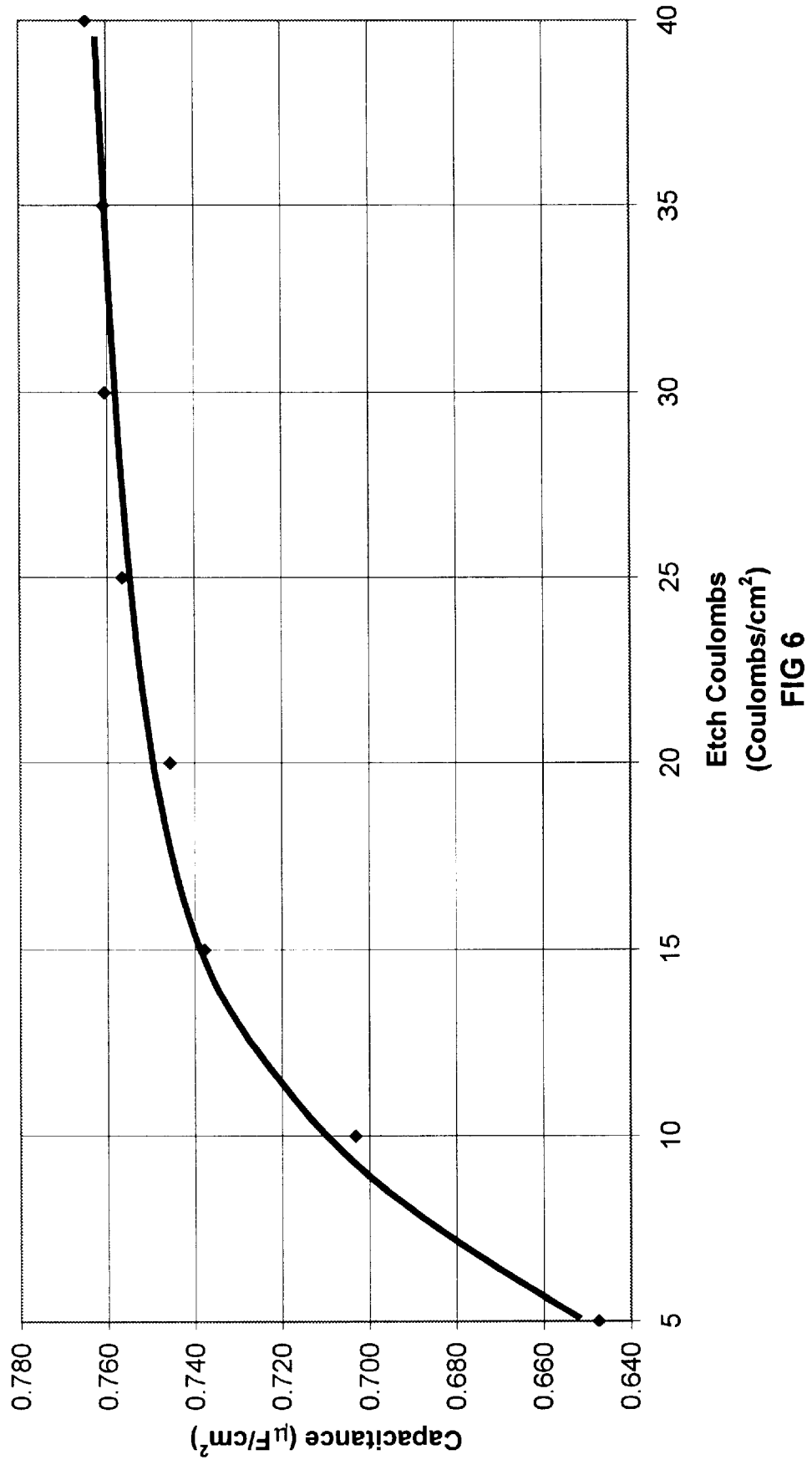
FIG. 6 shows capacitance as a function of the etch coulombs for an etch solution containing 0.62% HCl, 3.5% $NaClO_4$, 5% $H_2SO_4$ and 0.5% Al (as aluminum chloride hexahydrate).

Sample foils were etched in a solution of 0.62% HCl, 3.5% $NaClO_4$, 5% $H_2SO_4$, and 0.5% Al, as aluminum chloride hexahydrate, each at a current density of 0.25 amp/$cm^2$ and at varying etching charges. Sample foils were widened at 78 coulombs/$cm^2$ and 0.15 amps/$cm^2$ current density at a temperature of 70° C. The foils were hydrated for 8 minutes in 95° C. DI water. The foils are put through a formation process, known by people skilled in the art, that will produce foil with an EFV of 435 Volts. The results, shown in Table 7 below, indicated that aluminum is produced as a by-product in the etch process. The experiment proved that the etch process would allow for the by-product of Aluminum to be acceptable and would not effect capacitance of the etched foil, see FIG. 6.

Etch Solution Study (Table 7)

| Etch Charge (coulombs/$cm^2$) | Capacitance ($\mu F/cm^2$) |
|---|---|
| 5 | 0.647 |
| 10 | 0.703 |
| 15 | 0.738 |
| 20 | 0.746 |
| 25 | 0.757 |
| 30 | 0.761 |
| 35 | 0.761 |
| 40 | 0.765 |

EXAMPLE 8

Figure 7:
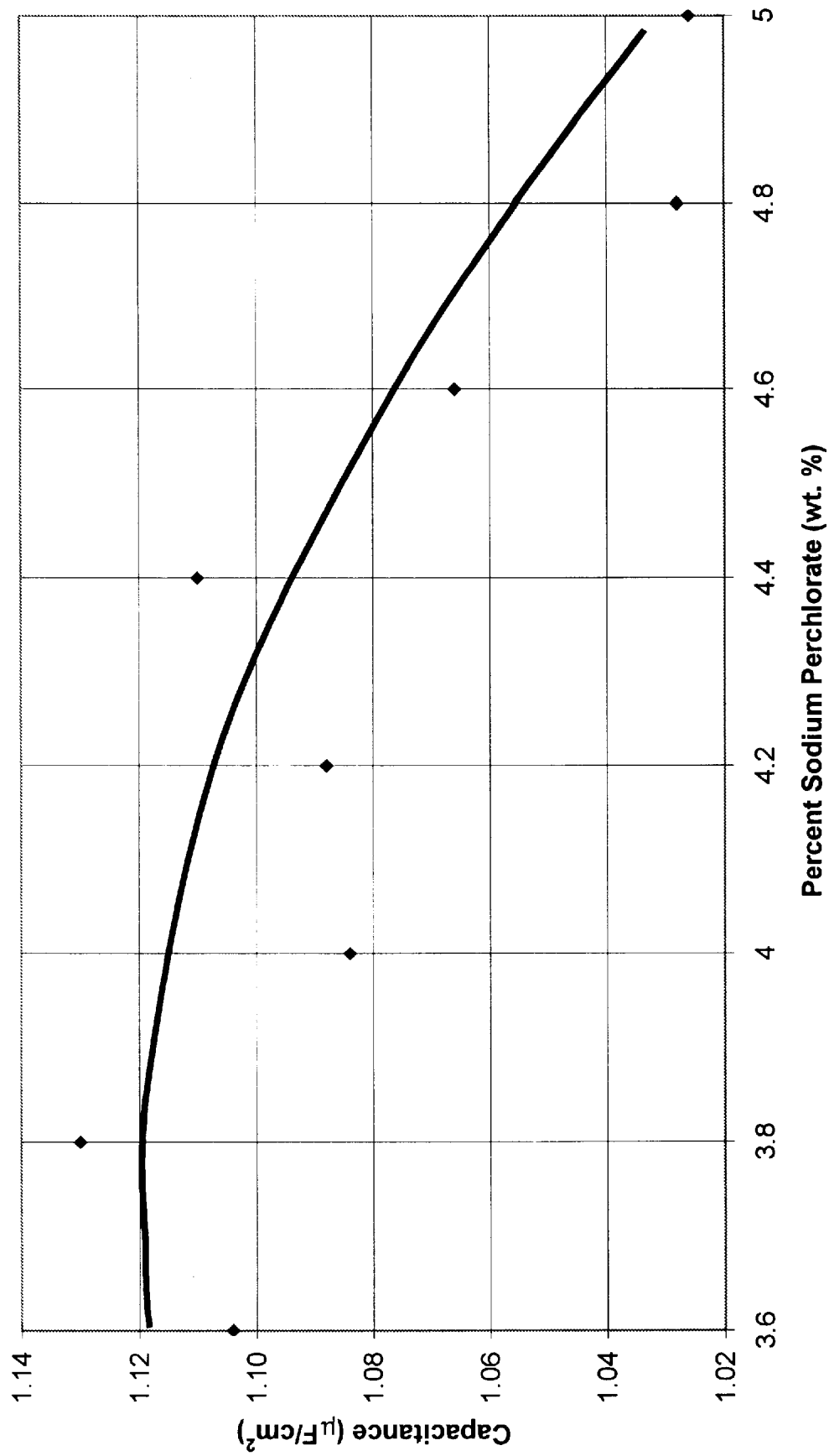
FIG. 7 shows capacitance as a function of the percent of sodium perchlorate in an etch solution containing sodium perchlorate, 0.8% HCl and 0.5% $Na_2S_2O_8$ (as an oxidizer).

A solution of 3.6% $NaClO_4$, 0.8% HCl, and 0.5% $Na_2S_2O_8$, as an oxidizer, was made and sample foils were etched as the percent $NaClO_4$ was increased in the etch solution, up to 5.0%. All foils were etched at 25 coulombs/$cm^2$, a current density of 0.25 amp/$cm^2$, and at a temperature of 84° C. Sample foils were widened at 78 coulombs/$cm^2$ and 0.15 amps/$cm^2$ current density at a temperature of 70° C. The foils were hydrated for eight minutes in 95° DI water. The foils were put through a formation process, known by the people skilled in the art, to produce foil with an EFV of about 435 Volts. The results, shown in Table 8 below, indicated that the etch solution with 3.8% $NaClO_4$ had the peak capacitance of 1.12 $\mu F/cm^2$, see FIG. 7.

Etch Solution Study (Table 8)

| % NaClO$_4$ | Capacitance ($\mu$F/cm$^2$) |
|---|---|
| 3.6 | 1.102 |
| 3.8 | 1.130 |
| 4.0 | 1.084 |
| 4.2 | 1.087 |
| 4.4 | 1.110 |
| 4.6 | 1.065 |
| 4.8 | 1.028 |
| 5.0 | 1.026 |

All references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for etching an aluminum anode foil, comprising
   (a) treating said aluminum anode foil in an acidic electrolyte bath composition containing aluminum chloride hexahydrate, hydrochloric acid, sodium perchlorate or perchloric acid, and sulfuric acid; and
   (b) passing a direct current (DC) charge through said aluminum anode foil, while said foil is immersed in said acidic electrolyte bath; such that said aluminum anode foil is etched.

2. A process according to claim 1, wherein said electrolyte bath composition comprises 0.1–1.0 percent by weight aluminum chloride hexahydrate.

3. A process according to claim 1, wherein said electrolyte bath composition comprises 0.1–5.0 percent by weight hydrochloric acid.

4. A process according to claim 1, wherein said electrolyte bath composition comprises 0.5–36.0 percent by weight sodium perchlorate or perchloric acid.

5. A process according to claim 1, wherein said electrolyte bath composition comprises 0.1–25 percent by weight sulfuric acid.

6. A process according to claim 1, wherein the temperature of said electrolyte bath is 8–95° C.

7. A process according to claim 1, wherein said DC charge has current density of 0.1–0.5 A/cm$^2$.

8. A process according to claim 1, wherein said DC charge is 10–50 coulombs/cm$^2$.

9. A process according to claim 1, wherein the ratio of chloride to perchlorate in said acidic electrolyte bath composition is 0.14–0.17 grams by weight chloride per gram by weight of perchlorate.

10. A process according to claim 1, wherein the pH of said acidic electrolyte bath is 0–1.5.

11. Etched aluminum anode foil, provided by a process comprising
    (a) treating said aluminum anode foil in an acidic electrolyte bath composition containing aluminum chloride hexahydrate, hydrochloric acid, sodium perchlorate or perchloric acid, and sulfuric acid; and
    (b) passing a direct current (DC) charge through said aluminum anode foil, while said foil is immersed in said acidic electrolyte bath; such that said aluminum anode foil is etched.

12. An electrolyte bath composition for etching aluminum anode foil, comprising:
    (a) aluminum chloride hexahydrate;
    (b) hydrochloric acid;
    (c) sulfuric acid; and
    (d) perchloric acid or sodium perchlorate.

13. A composition according to claim 12, wherein said electrolyte bath composition comprises 0.1–1.0 percent by weight aluminum chloride hexahydrate.

14. A composition according to claim 12, wherein said electrolyte bath composition comprises 0.1–5.0 percent by weight hydrochloric acid.

15. A composition according to claim 12, wherein said electrolyte bath composition comprises 0.5–36.0 percent by weight sodium perchlorate or perchloric acid.

16. A composition according to claim 12, wherein said electrolyte bath composition comprises 0.1–25 percent by weight sulfuric acid.

17. An electrolyte bath composition according to claim 12, wherein the ratio of chloride to perchlorate in said electrolytic bath composition is 0.14–0.17 grams by weight chloride per gram by weight of perchlorate.

18. An electrolyte bath composition according to claim 13, where said electrolytic bath composition comprises 0.5 percent by weight aluminum chloride hexahydrate, 0.62 percent by weight hydrochloric acid, 4.0 percent by weight sulfuric acid and 3.5 percent by weight sodium perchlorate.

19. An electrolytic capacitor comprising aluminum anode foil etched according to a process comprising
    (a) treating said aluminum anode foil in an acidic electrolyte bath composition containing aluminum chloride hexahydrate, hydrochloric acid, sodium perchlorate or perchloric acid, and sulfuric acid; and
    (b) passing a direct current (DC) charge through said aluminum anode foil, while said foil is immersed in said acidic electrolyte bath; such that said aluminum anode foil is etched.

* * * * *

UNITED STATES PATENT AND TRADEMARK OFFICE
CERTIFICATE OF CORRECTION

PATENT NO. : 6,168,706 B1   Page 1 of 1
DATED : January 2, 2001
INVENTOR(S) : Hemphill et al.

It is certified that error appears in the above-identified patent and that said Letters Patent is hereby corrected as shown below:

<u>Claim 6,</u>
Line 2, after "is", delete "8" and replace with -- 80 --

Signed and Sealed this

Nineteenth Day of February, 2002

*Attest:*

JAMES E. ROGAN
*Attesting Officer*    *Director of the United States Patent and Trademark Office*